United States Patent
Zeiger et al.

(10) Patent No.: US 9,914,407 B2
(45) Date of Patent: Mar. 13, 2018

(54) HEAD UNIT WITH INTERCHANGEBLE FUNCTIONAL BEZEL

(71) Applicant: Continental Automotive Systems, Inc., Auburn Hills, MI (US)

(72) Inventors: David Zeiger, Mundelein, IL (US); Thomas Brey, Lake in the Hills, IL (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 166 days.

(21) Appl. No.: 14/534,336

(22) Filed: Nov. 6, 2014

(65) Prior Publication Data

US 2016/0129849 A1 May 12, 2016

(51) Int. Cl.
  *B60R 11/02* (2006.01)
  *B60R 13/02* (2006.01)
  *B60K 37/00* (2006.01)

(52) U.S. Cl.
  CPC .......... *B60R 13/0256* (2013.01); *B60K 37/00* (2013.01); *B60K 2350/1028* (2013.01); *B60K 2350/925* (2013.01); *B60K 2350/941* (2013.01)

(58) Field of Classification Search
  CPC .............. B60K 2350/941; B60K 37/00; B60K 2350/1028; B60K 2350/925; B60R 11/02; B60R 13/0256
  See application file for complete search history.

(56) References Cited

U.S. PATENT DOCUMENTS

| 5,808,373 | A | * | 9/1998 | Hamanishi | B60K 37/04 219/202 |
| 5,873,749 | A | * | 2/1999 | Takiguchi | B60K 37/00 174/72 A |
| 6,983,171 | B2 | * | 1/2006 | Van Bosch | H04B 1/3822 379/52 |
| 9,729,181 | B2 | * | 8/2017 | Brey | H04B 1/3822 |
| 2001/0016432 | A1 | * | 8/2001 | Yamauchi | B60H 1/00985 439/34 |
| 2007/0236880 | A1 | * | 10/2007 | Noisternig | G11B 17/051 361/690 |
| 2009/0130884 | A1 | * | 5/2009 | Howard | B60R 11/02 439/297 |
| 2010/0090870 | A1 | * | 4/2010 | Masuda | B60R 11/02 340/995.26 |

(Continued)

FOREIGN PATENT DOCUMENTS

EP    2151352 A    2/2010

OTHER PUBLICATIONS http://news.softpedia.com/news/Nokia-Details-Lumia-820-s-Interchangeable-Covers-292832.shtml; retrieved from the internet on Nov. 5, 2014.

(Continued)

*Primary Examiner* — James Wu

(57) ABSTRACT

The rear side of a head unit bezel is shaped and arranged to receive and retain an electronic device such as a radio, cell phone, GPS receiver, roadway toll payment transponder, stolen vehicle transponder, WI-FI or Bluetooth transceiver or an antenna. Electrical connectors provided to the rear side mate with connectors on the front side of a head unit. When the bezel and head unit are connected, the electronic device in the bezel is mechanically and electrically connected to the head unit.

5 Claims, 8 Drawing Sheets

(56) References Cited

U.S. PATENT DOCUMENTS

2011/0053549 A1* 3/2011 Lai .................. B60R 11/02
455/345
2012/0193933 A1* 8/2012 Spitler .................. B60R 11/02
296/74

OTHER PUBLICATIONS

Search Report dated May 15, 2015, from corresponding GB Patent Application No. GB1420952.2.

* cited by examiner

HEAD UNIT WITH INTERCHANGEBLE FUNCTIONAL BEZEL

BACKGROUND

Most motor vehicles are provided with electronic entertainment and information devices that are operated through a common or single user interface area located on the vehicle's dash board. Examples of such electronic devices include a radio receiver for commercial broadcast bands, a CD or DVD player, an MP-3 player, navigation system or a cell phone.

The ability to customize the type of devices that are provided and the functionality of them within a particular vehicle currently resides at the factory where the vehicle is assembled. Retrofitting such entertainment systems typically requires the use of "aftermarket" components and/or bulky antennas that need to be mounted somewhere on the automobile.

Upgrading a factory installation to add or change an electronic device requires extensive disassembly of at least the dashboard. An example of upgrading a factory-installed device would be replacing a "3G" data network access device with a "4G" data network device or adding a navigation system. An apparatus and method that can facilitate an after-sale upgrade or change to a factory-installed entertainment/information system would be an improvement over the prior art.

BRIEF SUMMARY

In accordance with embodiments of the invention, the rear side of a head unit bezel is shaped and arranged to receive and retain an electronic device such as a radio, cell phone, GPS receiver, roadway toll payment transponder, stolen vehicle transponder, WI-FI or Bluetooth transceiver or an antenna. Electrical connectors provided to the rear side mate with connectors on the front side of a head unit. When the bezel and head unit are connected, the electronic device in the bezel is mechanically and electrically connected to the head unit.

DETAILED DESCRIPTION

As used herein, the term "bezel" refers to a piece of trim placed over and/or around a device or thing comprising a vehicle's dashboard. The dashboard is a panel extending across the interior of a vehicle and located below the windshield and usually containing instruments such as a speedometer and controls. A bezel is thus essentially a decorative cover or surrounding for an instrument or control.

Figure 1:
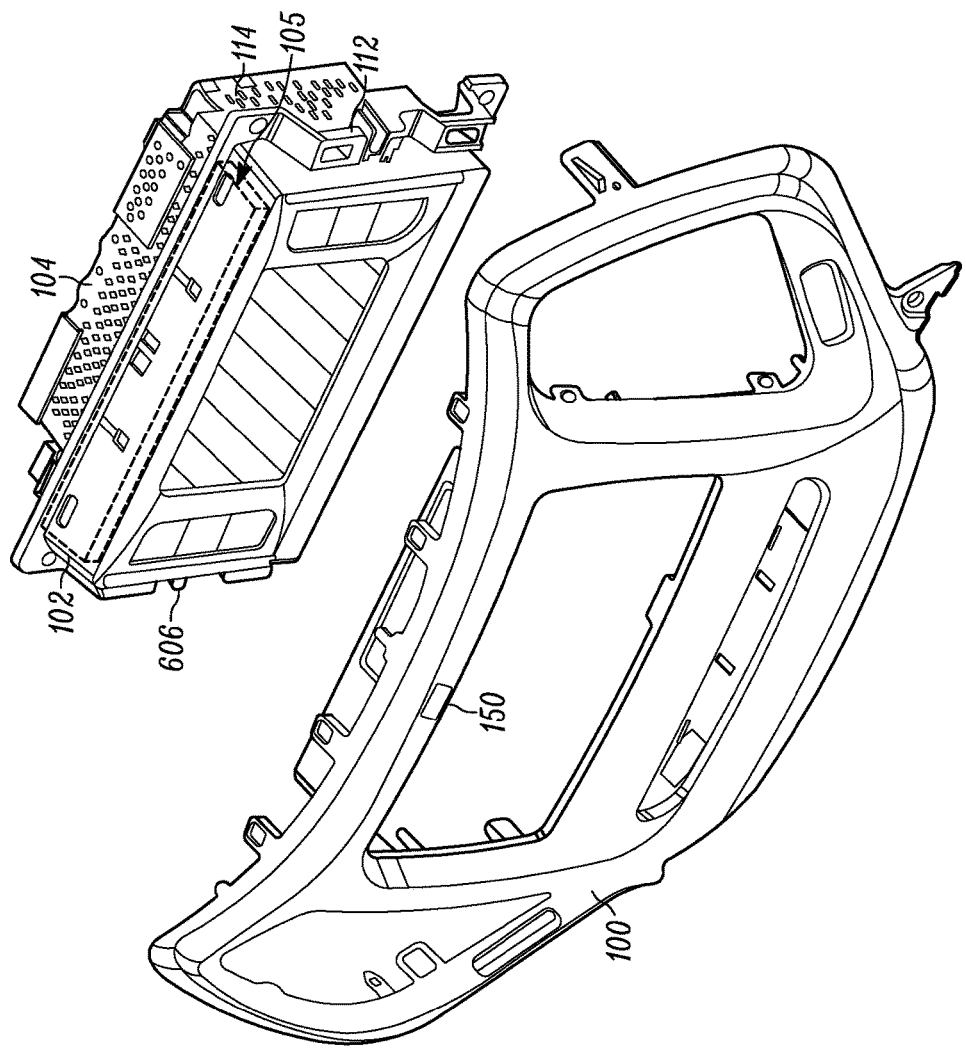
FIG. 1 is an exploded view of a bezel for covering a head unit of a vehicle entertainment system.

FIG. 1 is an exploded view of a bezel 100 for covering a head unit 102 of a vehicle entertainment/information system, most of the components of which are enclosed within a housing 104. The head unit 102 thus provides a user interface, e.g. buttons, switches, and other controls, by which the vehicle entertainment system components can be operated and adjusted.

The vehicle entertainment/information system components are frequently vehicle-specific and can include a commercial broadcast radio frequency receiver, i.e., an AM and/or FM receiver. The vehicle entertainment system can also include a vehicle navigation system, MP-3 player, DVD or CD player, a telematics system, a cell phone. The system components can also include short-range radio frequency transponders used on some U.S. highways to pay tolls without having to stop the vehicle. The State of Illinois "I-PASS" transponder is one well-known example of such a transponder.

Figure 2:
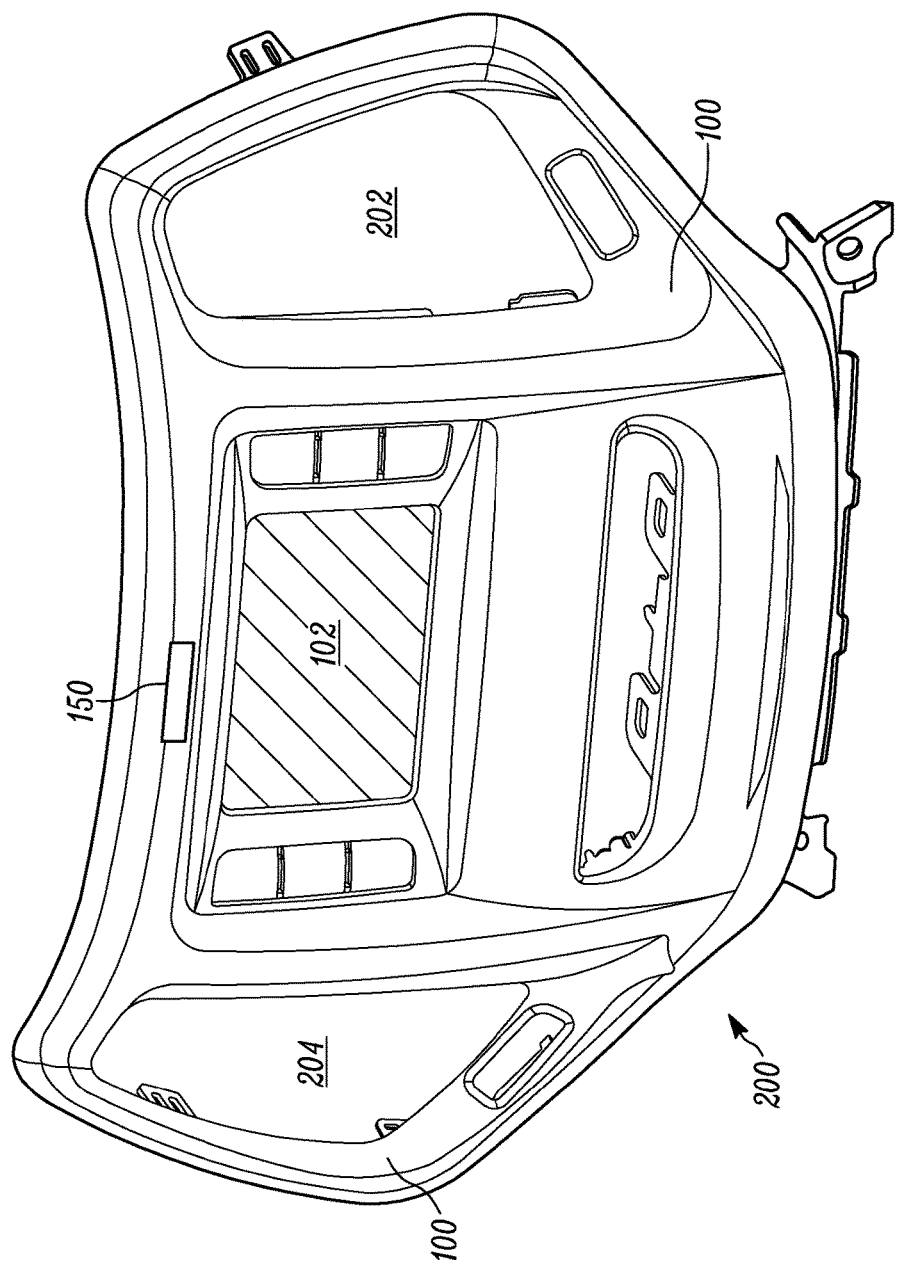
FIG. 2 is a perspective view of the bezel installed over the head unit.

FIG. 2 is a perspective view of the front side 200 of the bezel 100 placed over the head unit 102. The bezel 100 essentially wraps around the head unit 102 and conceals unsightly open space as well as the mechanical connections that are necessarily located around the exterior of the head unit 102.

The open spaces 202 and 204 on the right and left hand sides of the head unit 102 respectively accommodate air conditioning vents of a vehicle, not shown. The bezel 100 shown in FIGS. 1 and 2 thus provides a decorative trim piece and cover for both the head unit 102 and air conditioning outlets.

Figure 3:
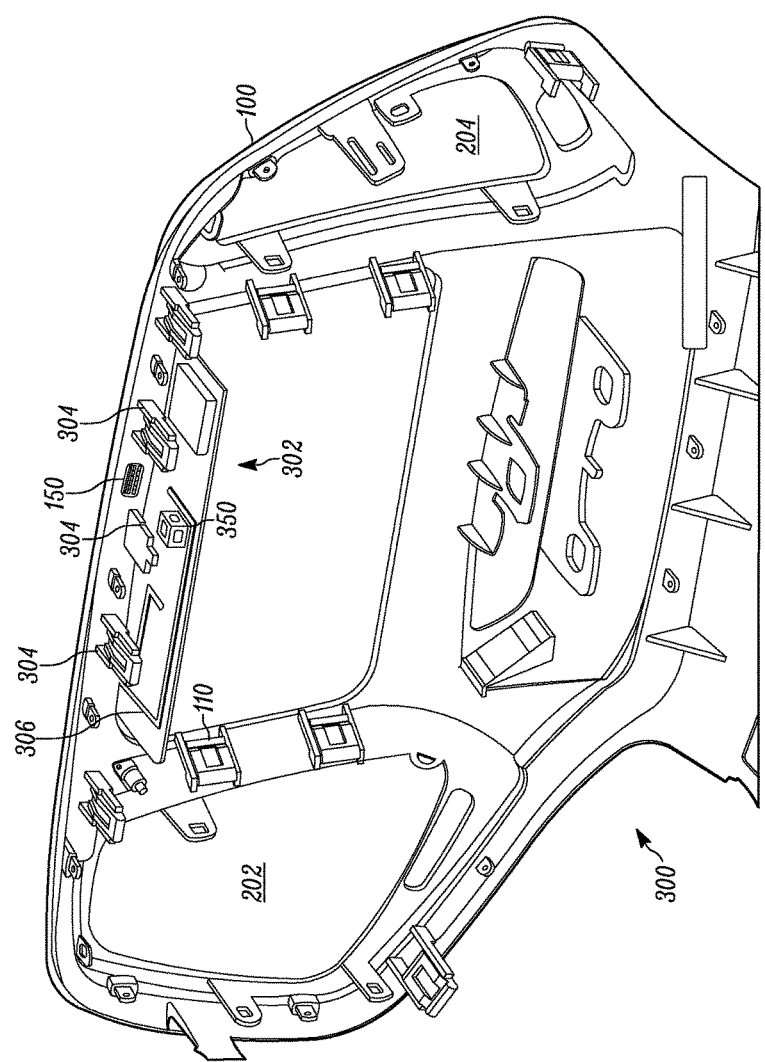
FIG. 3 shows the rear side of a bezel that is provided with an electronic device such as a radio, cell phone, MP-3 player or GPS receiver.

As stated above, FIG. 2 shows the front side 200 of the bezel 100. FIG. 3 on the other hand shows the rear side 300 of the bezel 100.

Referring now to FIG. 3, the rear side 300 is mechanically supports an electronic device 302. The electronic device 302 comprises one or more passive or active electronic circuit devices that are attached to/mounted on a conventional circuit board 306 by way of substantially U-shaped clips 304. An edge of the circuit board 306, not visible in FIG. 2, is slid into the U-shaped clips 304 and faces the rear side 300 of the bezel 100.

Attaching the electronic device 302 such that the circuit board 306 is substantially perpendicular to the rear side 300 enables the circuit board 306 to be concealed into an open space directly above or below the head unit 102. The open space above the head unit 102 is best seen in FIG. 1 and identified by reference numeral 105. The open space above the head unit 102 is an open volume having a shape that is preferably a right rectangular prism. The electronic device 302 and its associated circuit board 306 are cooperatively sized, shaped and arranged with the rear side 300 of the bezel 100 and the open space above the head unit 102 such that the electronic device 302 is not visible, i.e. it fits inside the open space and is concealed, when the bezel 100 with device 302 attached to it is placed over the head unit 102 to cover it, as shown in FIG. 2.

Figure 4:
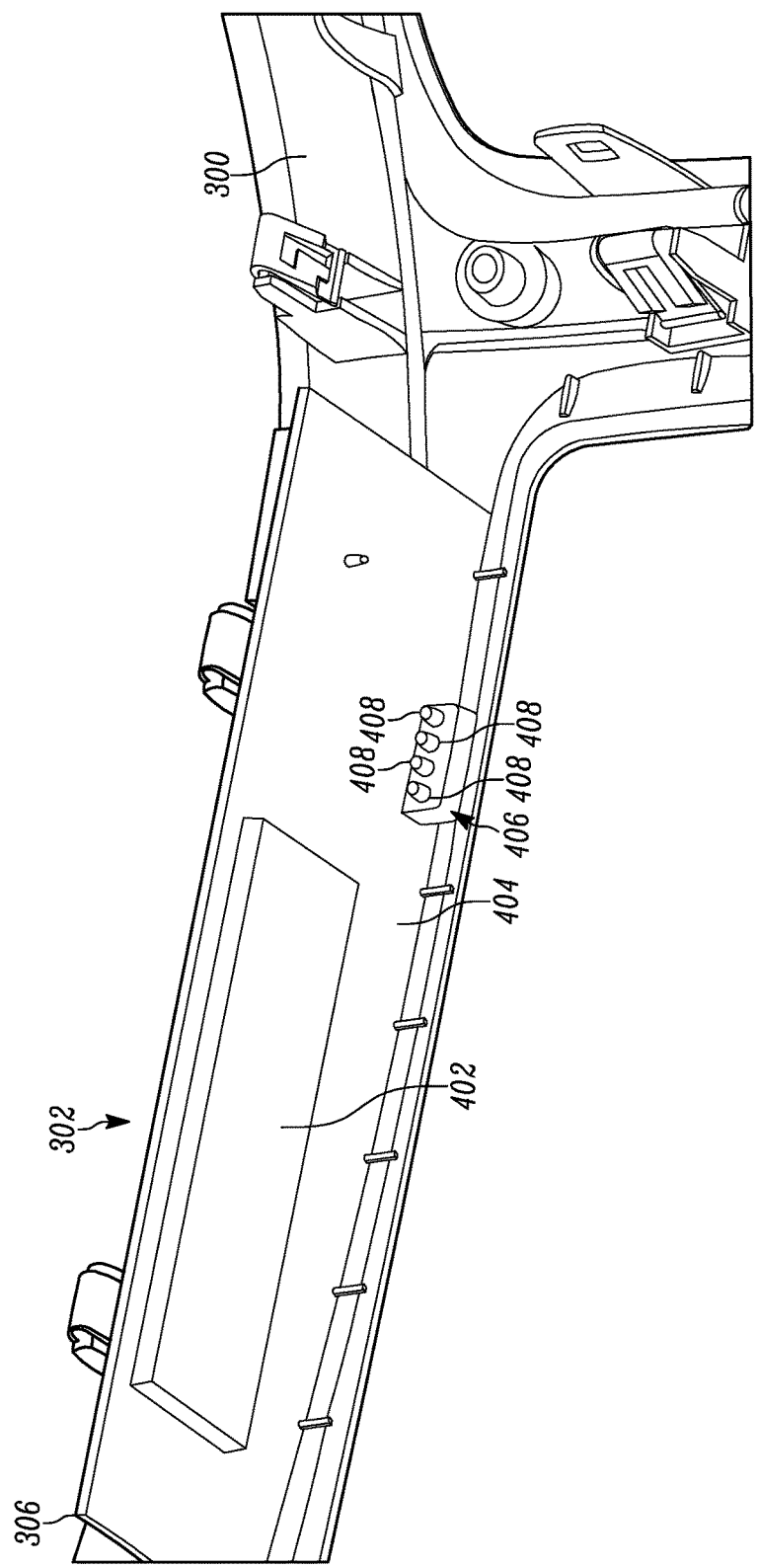
FIG. 4 is an isolated perspective view of the upper-right hand corner of the bezel, viewed from the rear of the bezel.

FIG. 4 is an isolated perspective view of the upper-right hand corner of the bezel 100, viewed from the rear side 300. Electronic components 402 are depicted in FIG. 4 as being mounted on the side of the circuit board 306 that faces downwardly, i.e., on the underside or lower side 404 of the circuit board 306.

FIG. 4 also shows an electrical connector 406 below the circuit board 306. The connector 406 comprises four electrical contacts 408, electrically-isolated from each other. The contacts 408 are sized, shaped and arranged to make electrical and mechanical contact with mating contacts at a corresponding location on the front side of the head unit 102.

Figure 5:
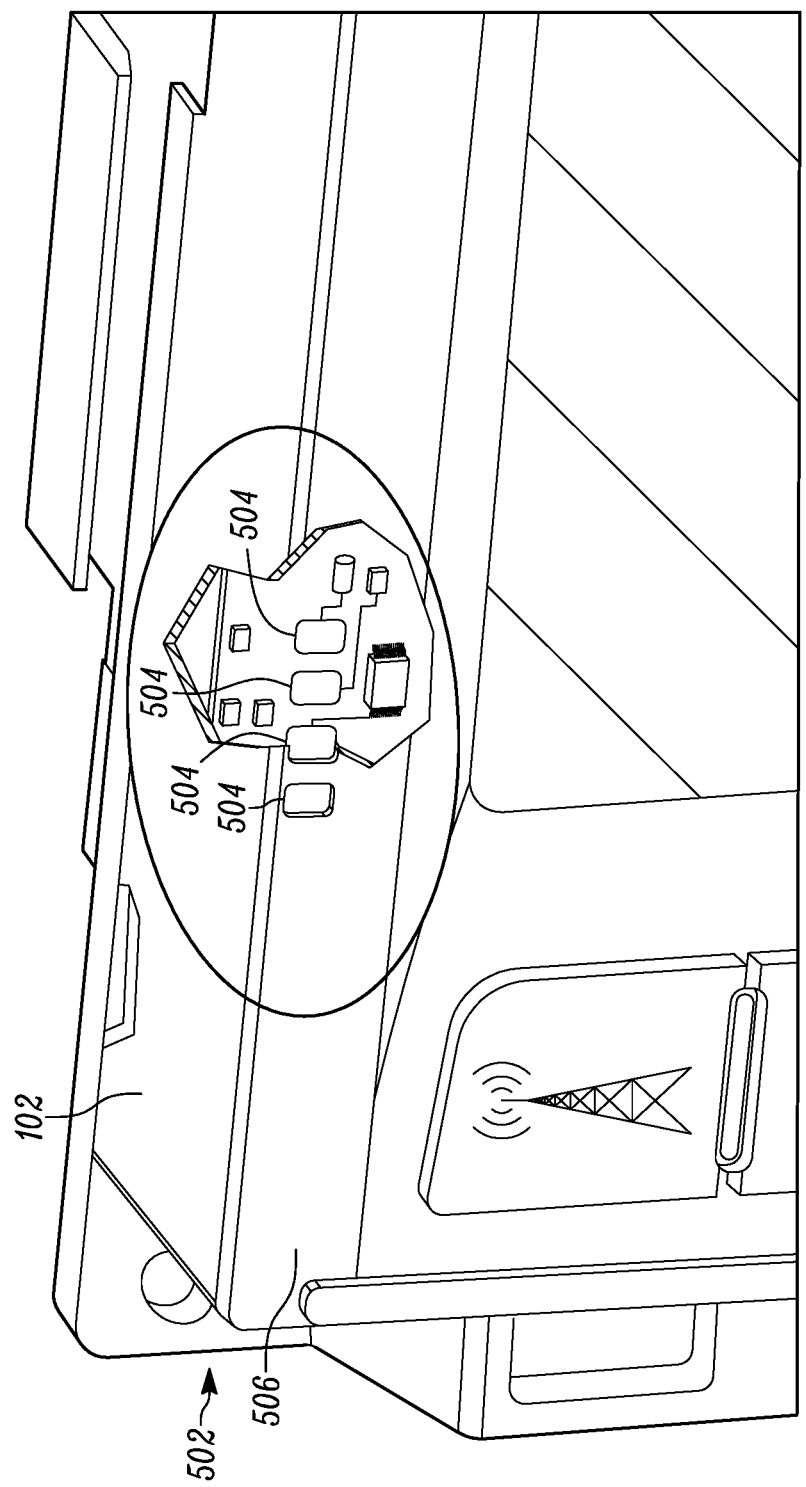
FIG. 5 is an isolated perspective view of the upper-left-hand corner of the head unit.

FIG. 5 is an isolated perspective view of the upper-left-hand corner 502 of the head unit 102. Four electrical contacts 504 can be seen proximate to the upper left-hand corner 502 of the head unit 102. The contacts 504 are positioned on the head unit 102 front such that when the bezel 100 is snapped in place as shown in FIG. 2, the contacts 408 on the rear side 300 of the bezel 100 will electrically and mechanically contact and mate with the electronic contacts 504 on the front side 506 of the head unit 102.

The contacts 408 on the bezel 100 are electrically connected to electronic devices on the circuit board 306. The contacts 504 on the head unit 102 are electrically connected to electronic devices in the head unit 102 and in the housing 104. The contacts 408 and 504 thus provide an electrical pathway or connection between the electronic devices 302 attached to the rear side 300 of the bezel 100 and electrical components and devices inside the vehicle entertainment system, i.e., in the head unit 102 and housing 104.

Figure 6:
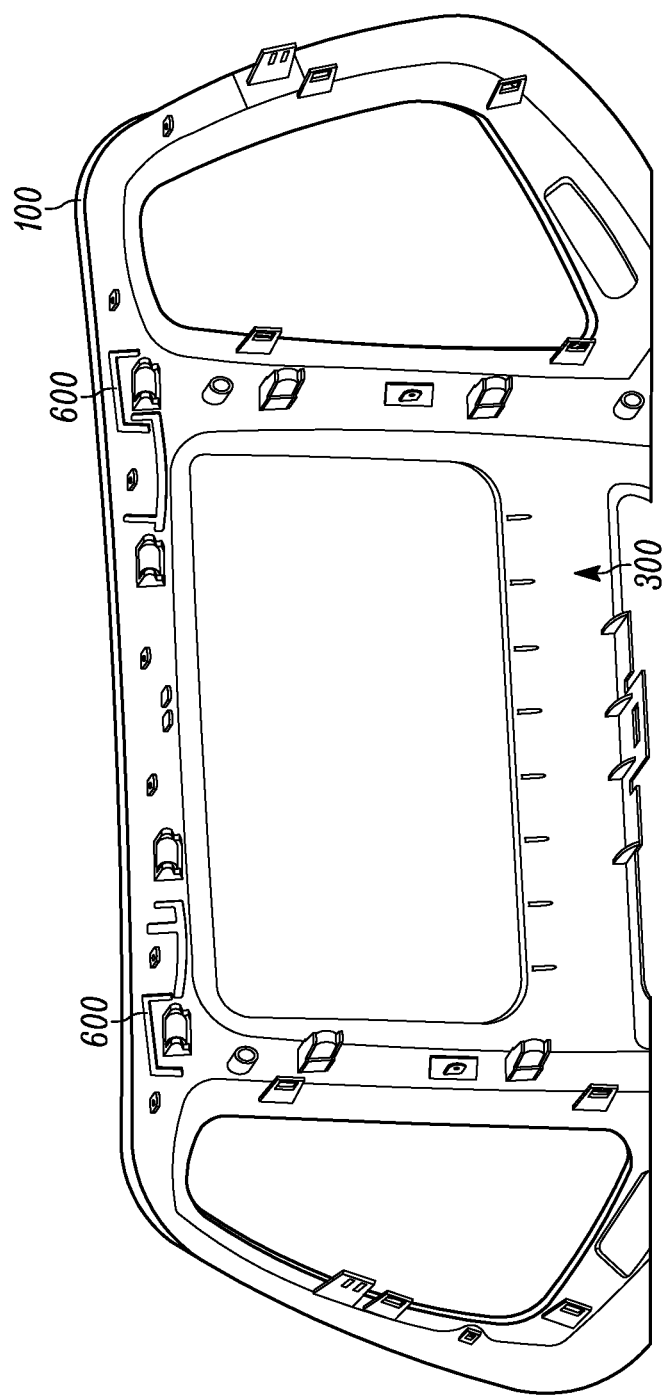
FIG. 6 is a perspective view of the rear side of an alternate embodiment of a bezel where the electronic device carried by the bezel is an antenna.

FIG. 6 is a perspective view of the rear side 300 of an alternate embodiment of a bezel 100. In FIG. 6, the electronic device is simply an end-fed antenna 600. Since the bezel 100 is essentially in the passenger compartment, the antenna 600 is thus outside the head unit 102 and outside the usually-metal housing 104 in which various electronic devices are located. Locating the antenna in the bezel 100 instead of the head unit or housing 104 was experimentally determined to increase the signal-to-noise ratio of signals that are "picked up" by the antenna.

Figure 7:
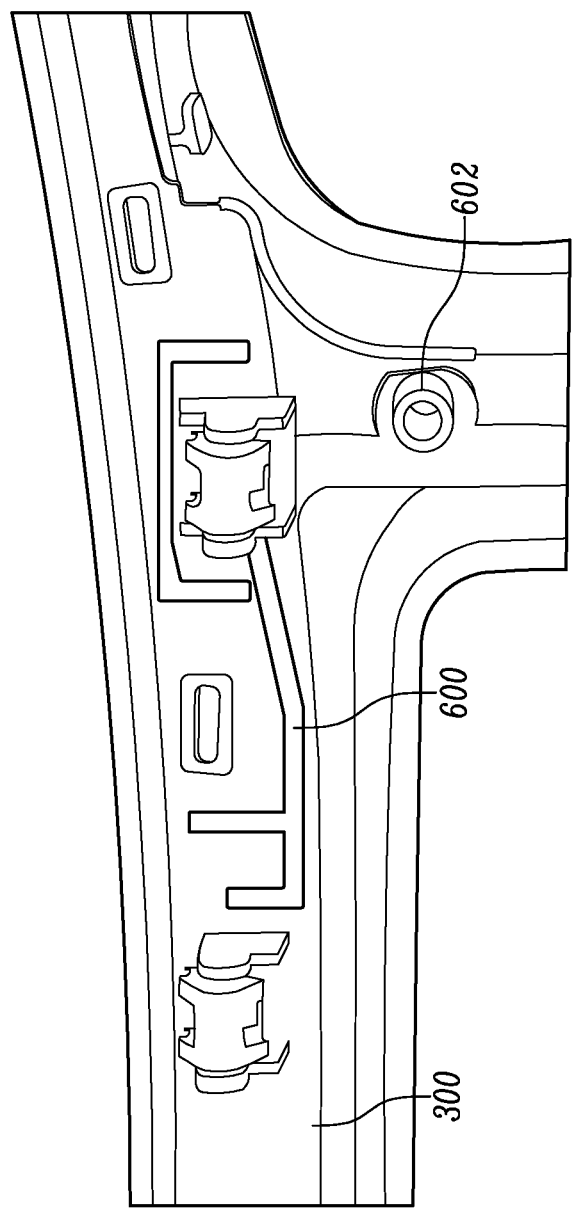
FIG. 7 is a close-up view of the rear side of the bezel showing how an end-fed antenna connected to an antenna connector.

FIG. 7 is a close-up view of the rear side 300 of the bezel 100 showing how an end-fed antenna 600 is connected to a connector 602. The connector 602 and antenna are sized, shaped and arranged such that the connector 602 mechanically and electrically engages a mating connector 606 on the front side of the head unit 102.

As used herein, the term "broadcast" refers to a mode of information transfer in which a single message is transmitted simultaneously to multiple receivers. As used herein, a broadcast receiver is thus a radio frequency receiver that receives a radio frequency signal that is transmitted to many different receivers, regardless of the signal's frequency or wavelength and regardless of the modulation scheme used to convey information on a radio frequency signal.

In one embodiment, the electronic device 302 located in the bezel 100 (see FIG. 3) is a broadcast-band radio frequency receiver, i.e., a receiver configured to receive signals that are broadcast in one or both of the commercial AM and FM frequency bands. Broadcast-band radio receivers can also include radio frequency receivers that are capable of receiving signals that are broadcast from satellites, an example of which are the signals provided by SIRIUSXM SATELLITE RADIO®.

The electronic contacts 408 and 504 enable a radio frequency receiver or other type of electronic device 302 to be tuned or adjusted using controls provided on or by, the head unit 102 by virtue of the electrical pathways provided by the electrical contacts. Stated another way, the contacts 408 on the bezel and the contacts 504 on the head unit 102 to provide electrical connections between the radio and the head unit enabling the radio/electronic device 302 to be controlled from the head unit 102. A removability of the bezel enables the radio or other electronic device 302 in the bezel 200 to be changed or removed according to a manufacturer's or purchaser's preferences over time.

In another embodiment, the electronic device 302, (see FIG. 3) is a wireless communications device such as a "cell phone." As is well known, different cellular telephony technologies require different radios. Mounting a cell phone to the rear side 300 of a bezel 100 but outside the head unit 102 and outside a confining chassis or container 104 enables a vehicle manufacturer or vehicle purchaser to select a particular wireless technology with the head unit 102, that provides a user interface to all such devices.

In another embodiment, the electronic device 302 is a global positioning system receiver. In such an embodiment, it too is controlled through a user interface provided by the head unit 102. Electrical connections exist between the GPS receiver and the head unit 102 by virtue of the aforementioned electrical contacts.

In other embodiments, the electronic device 302 is a Bluetooth transceiver. It is configured to "pair" a passenger's Bluetooth-capable cell phone to a Bluetooth-capable vehicle audio system including a microphone and speakers in the passenger compartment.

As used herein, a "stolen vehicle transponder" (SVT) comprises at least a radio frequency transmitter that broadcasts a radio frequency signal after a vehicle is stolen. The signal broadcast from the SVT provides the vehicle's location, which is typically obtained by the SVT from a navigation system on the vehicle and which is coupled to the SVT. In other embodiments, the electronic device 302 is a stolen vehicle transponder (SVT).

In another embodiment, the electronic device 302 is an 802.11-compliant transceiver, commonly referred to as "WI-FI." In yet other embodiments, the electronic device is a transponder for a highway toll payment system, an example of which is a transponder used by the State of Illinois and commonly referred to as an "I-PASS" transponder or an "E-Z PASS" transponder used by the State of Rhode Island.

conventional infrared (IR) receiver 350. It is mounted on the circuit board 306 immediately behind a conventional IR-transparent window 150 that extends through the bezel 100. The window 150 allows information-bearing infrared energy to pass through it and strike the IR receiver 350. Conventional devices on the circuit board 306 recover information that was modulated onto the IR and forwards it to circuitry and devices inside the head unit 102.

In yet another embodiment, the electronic device 302 is a processor and associated memory, well known to those of ordinary skill in the art. The processor provides control functionality for the head unit as well as any other entertainment system components located in the cabinet 104. The electrical contacts 408 on the bezel 100 and the electrical contacts 504 on the head unit 102 form at least part of a conventional bus that extends between the processor and peripheral components in the head unit and elsewhere.

As used herein, a bus is considered to be a set of electrically parallel conductors in a computer system that form a main transmission path between components of the computer system. The bus typically includes address, control and data lines.

Referring now to any one of FIG. 1, FIG. 2, FIG. 3, the bezel 100 is made of plastic. It is snapped in place over the head unit 102 using a prior art latch-type connector 110 and a mating detent or opening 112, preferably located in the sides 114 of the head unit 104. Those of ordinary skill in the art will recognize that the location or placement of the detent 112 and the latch 110 can be reversed. The use of a relatively flexible plastic latch and detent enables the bezel 100 to be "removably attached" to the head unit.

As used herein, "removably attached" means that the bezel can be snapped into place to cover the head unit when the vehicle is first manufactured. At a later time or date, the bezel 100 can be removed or detached from the head unit simply by prying the head unit 102 and bezel 100 apart from each other. After the bezel 100 is removed, an electronic device 300 can be removed or replaced and the bezel 100 re-attached to the same head unit using the same latch and detent attachment mechanisms.

Figure 8:
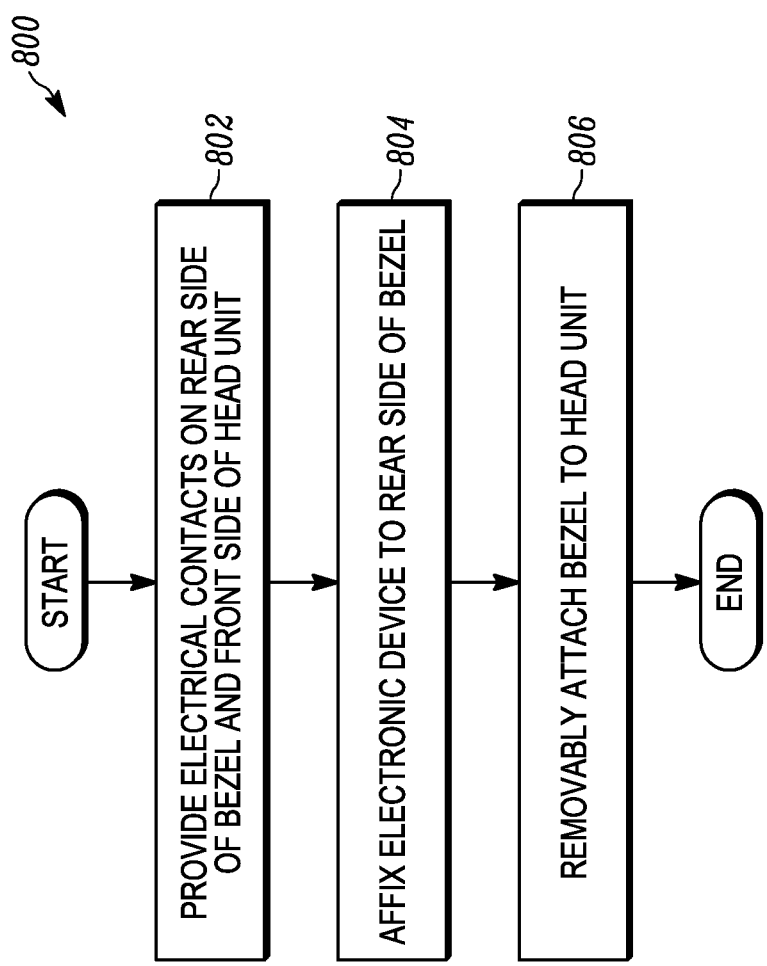
FIG. 8 depicts steps of a method of coupling the head unit of a motor vehicle infotainment system.

Finally, FIG. 8 depicts steps of a method of coupling the head unit of a motor vehicle infotainment system to an electronic device that is external to the head unit. As a first step 802, electrical contacts are provided on the rear side of the bezel and the front side of the head unit which will electrically and mechanically engage each other when the bezel is installed over the head unit. Before the bezel is installed, at step 804 an electronic device, such as one of those described above, is attached to the rear side of the bezel and its electronic components connected to the electrical contacts provided on the rear side of the bezel. As described above, the bezel and electronic device are cooperatively sized such that the bezel will completely conceal the device when the device and bezel are installed over the head unit. Finally at step 806, the bezel is "removably attached" to the head unit.

Those of ordinary skill in the art will recognize that step 804 can comprise the affixation of a two-way radio, an antenna, a GPS system or any other type of electronic device that can be coupled to and controlled from the head unit. The bezel need not be for a radio or vehicle entertainment system but can also be for a speedometer or other dashboard-located device.

The step of removably attaching the bezel to a head unit can comprise engaging a detent in latch as described above.

Those of ordinary skill in the art will also recognize that the electrical contacts 408 and 504 can instead be mating halves of a universal serial bus connector or "USB" connector. Such connectors are well known to those of ordinary skill in the computer art and a further description of them is omitted for brevity.

The foregoing description is for purposes of illustration only. The true scope of the invention is set forth in the following claims.

The invention claimed is:

1. A bezel for covering a head unit of a vehicle entertainment system, the head unit having a front side comprising a first plurality of electrical contacts that are connected to electronic devices in the head unit, the bezel having a front side facing into a vehicle passenger compartment and a rear side that faces the head unit front side, the bezel being made of a material non-conductive electrically and comprising:
  a cell phone mounted on a circuit board that is attached to the rear side of the bezel such that the circuit board is substantially perpendicular to the rear side of the bezel thereby enabling the circuit board to be concealed into an open space directly above or below the head unit, the cell phone and bezel being cooperatively sized, shaped and arrange such that the cell phone is not visible when the bezel is attached to the head unit and viewed from its front side;
  a second plurality of contacts, the second plurality of contacts being configured to mechanically and electrically mate with the first plurality of electrical contacts and thereby provide electrical connections between the first plurality of electrical contacts and the cell phone attached to the rear side of the bezel.

2. The bezel of claim 1, wherein the first plurality of electrical contacts and wherein the second plurality of electrical contacts are mating Universal Serial Bus connectors.

3. The bezel of claim 1, further comprising a latch configured to engage a detent coupled to the head unit, wherein engagement of the detent by the latch removably affixes the bezel to the head unit.

4. The bezel of claim 1, wherein the bezel is made of plastic.

5. The bezel of claim 1, wherein the bezel is removably attached to the head unit such that the cell phone can be removed and replaced by a different cell phone by removing the bezel from the head unit, removing the cell phone from the rear side of the bezel, affixing the different cell phone to the rear side of the bezel, and reattaching the bezel to the head unit.

\* \* \* \* \*